E. B. H. TOWER, Jr. & R. H. VAN NEST.
WELDING CONTROLLER.
APPLICATION FILED MAR. 11, 1915.
1,298,603.
Patented Mar. 25, 1919.
2 SHEETS—SHEET 1.
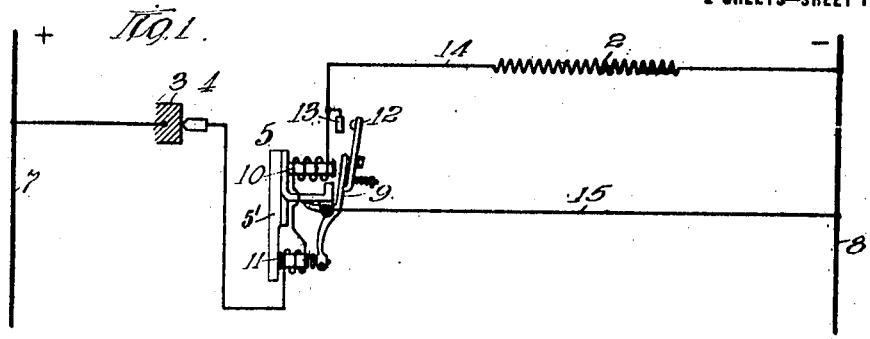
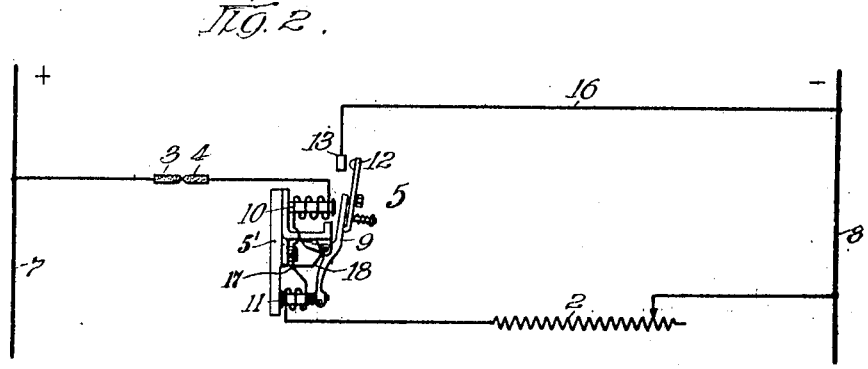
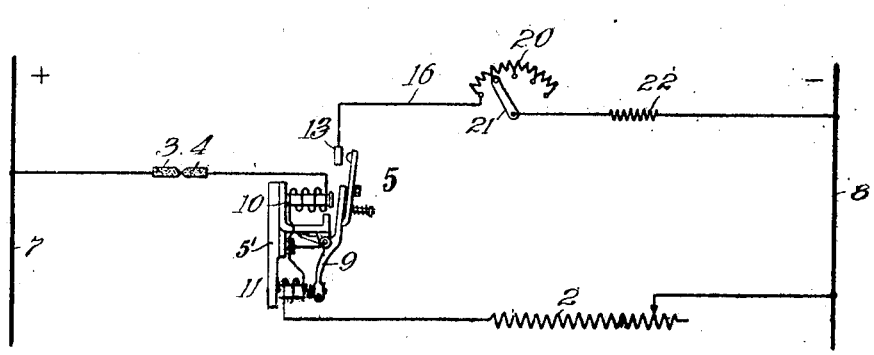

E. B. H. TOWER, Jr. & R. H. VAN NEST.
WELDING CONTROLLER.
APPLICATION FILED MAR. 11, 1915.

1,298,603.

Patented Mar. 25, 1919.
2 SHEETS—SHEET 2.

Witnesses:

Inventors
Edwin B. H. Tower Jr.
and Raymond H. Van Nest

UNITED STATES PATENT OFFICE.

EDWIN B. H. TOWER, JR., OF MILWAUKEE, WISCONSIN, AND RAYMOND H. VAN NEST, OF CHICAGO, ILLINOIS, ASSIGNORS TO THE CUTLER-HAMMER MFG. CO., OF MILWAUKEE, WISCONSIN, A CORPORATION OF WISCONSIN.

WELDING-CONTROLLER.

1,298,603.  Specification of Letters Patent.  Patented Mar. 25, 1919.

Application filed March 11, 1915. Serial No. 13,608.

*To all whom it may concern:*

Be it known that we, EDWIN B. H. TOWER, Jr., and RAYMOND H. VAN NEST, citizens of the United States, residing, respectively, at Milwaukee, in the county of Milwaukee and State of Wisconsin, and Chicago, in the county of Cook and State of Illinois, have invented new and useful Improvements in Welding-Controllers, of which the following is a full, clear, concise, and exact description, reference being had to the accompanying drawings, forming a part of this specification.

This invention relates to welding controllers.

The system of electric welding known as arc welding generally involves striking an arc between two electrodes or between an object to be welded and an electrode and using the heat of the arc for bringing the object to a welding temperature. The arc is usually obtained by completing the welding circuit by means of the electrodes and subsequently separating the electrodes to draw an arc. In order to prevent an excessive rush of current when the circuit is first completed, a current limiting means is associated with the welding circuit. Additional means is provided for subsequently regulating the current limiting means in order to increase the voltage across the arc to produce an arc of sufficient length and volume for welding purposes.

One of the objects of the present invention is to provide an improved welding controller for automatically regulating the welding current.

Another object is to provide a simplified controller for automatically regulating the welding current.

Another object is to provide a welding controller in which the number of controlling devices employed is reduced.

Another object is to provide an instrumentality which will automatically regulate the welding current and insure that the welding circuit is always in condition for safe operation.

Other objects and advantages of the invention will hereinafter appear.

The accompanying drawings illustrate embodiments of the invention, and in said drawings;

Figure 1 is a diagrammatic view of a controller embodying the invention.

Fig. 2 is a diagram of a similar controller having different connections.

Fig. 3 is a diagram of a modified form of controller.

Figure 4:
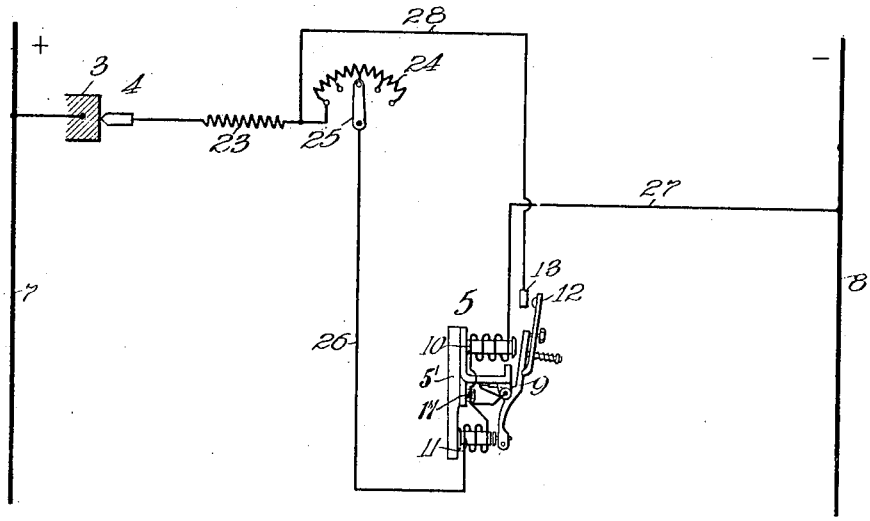
Figs. 4 and 5 illustrate other modified forms.

The controller comprises in general a current limiting means 2 for regulating the current through the welding electrodes 3 and 4, and an automatic switch 5 responsive to the current in the welding circuit for controlling the current limiting means.

The controller shown in Fig. 1 will first be described.

The current limiting means comprises a resistance 2 of any suitable type connected in series with electrodes 3 and 4 across supply mains 7 and 8. The resistance 2 limits the current to a safe value when the welding circuit is completed at the electrodes. The character and amount of this resistance may be varied to suit the working conditions. If desired, the resistance may be made adjustable.

The automatic switch 5 is provided with a movable member 9 electromagnetically controlled by coils 10 and 11 mounted on an insulating base 5'. The movable member 9 carries a contact 12 adapted to engage a stationary contact 13. The switch is of a type which will remain open when the current through its operating means rises rapidly to and is maintained above a predetermined value, but which will close when the current decreases to a predetermined value. A switch of this type is fully described in a co-pending application of Thomas E. Barnum, Serial No. 6,247 filed February 5, 1915.

The coils 10 and 11 of the switch are connected in series and are accordingly subjected to the same electrical conditions. They have different pull characteristics which are so related that when the energizing current rises rapidly to or is maintained above a predetermined value, the switch is held open by the coil 11 and when the current decreases to a predetermined value, the switch is closed by coil 10. The switch is normally biased to open position by gravity. When the circuit through the switch windings is broken, the member 9 automatically moves to open position and breaks the circuit between the contacts 12 and 13. The point at which the switch will operate may be adjusted by adjusting the armature of the coil 11 so as to vary the reluctance of the magnetic circuit. Other means of varying the relative effectiveness of coils 10 and 11 may be employed. It should be understood that other types of switches which will hold open when current through their operating means is high and will close when the current decreases to a predetermined value may be used.

The coils 10 and 11 of the switch 5 are connected in series with the electrodes 3 and 4 and the resistance 2. They are, therefore, directly responsive to the current in the welding circuit. When the contacts 12 and 13 of the switch are closed, a shunt circuit is completed around the resistance 2 which may be traced from the positive line 7 through electrode 3, electrode 4, coil 11, coil 10, contact 13, contact 12, movable switch member 9 and conductor 15 to negative line 8. It will thus be seen that when the switch is closed the resistance 2 is removed from the circuit.

The normal position of the controller is shown in Fig. 1. The switch 5 is open and the limiting resistance 2 is in series with the electrodes. The operation of the controller is as follows:

The welding circuit is completed at the electrodes 3 and 4 and current flows from the supply line 7 through electrodes 3 and 4, coils 11 and 10, and resistance 2 to line 8. An excessive rush of current is prevented by the resistance 2. The switch 5 is adjusted to hold open during the sudden rise of current and for the relatively high current which flows when the circuit is first completed. As the electrodes are drawn apart to strike an arc, the resistance between the electrodes increases and the current accordingly decreases. When the current decreases to a predetermined value, the switch 5 closes thereby removing the resistance 2 from the welding circuit and allowing the current to flow directly from line 7, through the electrodes, coils 11 and 10, switch arm 9 and conductor 15 to line 8. A heavy welding current is thus obtained, whose value is determined mainly by the resistance of the arc.

When the weld is completed and the electrodes are separated the welding circuit is broken and the coils 10 and 11 are deënergized. The switch 5 automatically opens and inserts the resistance 2 in the welding circuit so that the controller is again in condition for operation.

The welding circuit is therefore protected against an excessive rush of current when the circuit is first completed. The protecting means is automatically removed when the arc has been struck and the current has decreased to a proper value so that an increased voltage and current for welding purposes is secured. The protecting means is automatically reinserted when the welding circuit is broken thereby insuring that the apparatus is always in condition for safe operation.

Fig. 2 illustrates a controller similar to that of Fig. 1 but having different circuit connections for the switch 5. The coils 10 and 11 are connected to a binding post 17 on the switch frame, which binding post is also electrically connected to the movable member 9 of the switch. The contact 13 is connected directly to line 8 by conductor 16. The circuit is first completed from line 7, through electrodes 3 and 4, coil 10, binding post 17, coil 11 and resistance 2 to line 8. When the switch 5 closes, current flows from line 7 through the electrodes, coil 10, binding post 17, conductor 18, switch arm 9, contacts 12—13 and conductor 16 to line 8. In this form of controller the closing coil 10 is in circuit during the welding operation, whereas in the connections shown in Fig. 1, both the closing coil 10 and the holding coil 11 are in circuit after resistance 2 is cut out.

Fig. 3 illustrates a modification of the controller shown in Fig. 2 in which resistances 20 and 22 are inserted in the line 16. Resistance 20 is made adjustable by means of a movable arm 21. When the switch 5 closes the resistances 20 and 22 are connected in the welding circuit in shunt to the limiting resistance 2. Their value is such that substantially all the current is shunted from resistance 2. These resistances prevent an absolute short circuit in the event that after the arc has been established and the switch 5 operated, the electrodes are accidentally brought into contact. Of course, the resistances 20 and 22 must be of such a value that a proper welding current will flow while they are in the circuit. The combination of an adjustable resistance 20 and a fixed resistance 22 allows the amount of resistance in circuit to be varied and at the same time prevents all the resistance being cut out when the adjustable rheostat arm is moved to its extreme off position.

Fig. 4 illustrates still another modified form in which a limiting resistance 23 is provided which is always in the welding circuit. A starting resistance 24, which is adjustable by means of an arm 25, is controlled by the switch 5 for regulating the welding current.

When the welding circuit is completed at the electrodes 3 and 4, the current flows from line 7, through the electrodes, resistance 23, resistance 24, arm 25, conductor 26, coils 11 and 10 and conductor 27 to line 8.

When the current has decreased to a predetermined value, the switch 5 closes and a circuit is completed from line 7, through the electrodes, resistance 23, conductor 28, contacts 13—12, switch arm 9, binding post 17, coil 10 and conductor 27 to line 8. The adjustable resistance 24 is thereby removed from the circuit. The starting resistance may be varied in this form of controller and the limiting resistance 23 is always in circuit to protect against undue rushes of current whether the switch 5 is open or closed.

Figure 5:
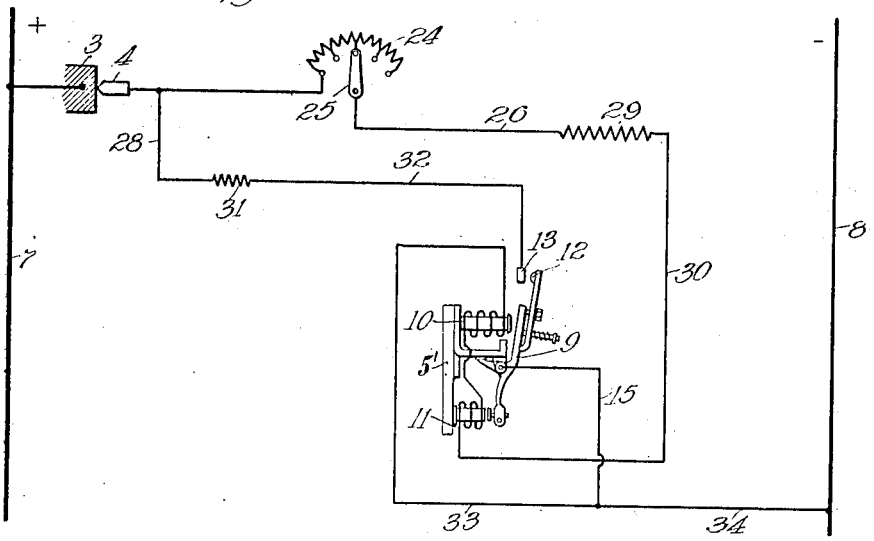

Fig. 5 illustrates a modification in which three resistances are used. When the circuit is completed at the electrodes 3 and 4, current flows from line 7, through the electrodes, resistance 24, conductor 26, resistance 29, conductor 30, coils 11 and 10 and conductors 33, 34 to line 8. When the current decreases to a predetermined value, the switch closes and a circuit is completed from line 7, through the electrodes, conductor 28, resistance 31, conductor 32, contacts 13, 12, switch arm 9 and conductors 15 and 34 to line 8. A shunt circuit is thereby completed around resistances 24 and 29. Sufficient current flows through the circuit including winding 10 to keep the switch closed, the amount of current required being small since the switch in its closed position seals the magnetic circuit of the winding. The resistance 31 acts to limit the current in case the resistance of the arc should suddenly be decreased. The resistances 24 and 29 limit the current at starting. The resistance 29 is a positive limiting resistance to prevent a damaging flow of current in the event that the arm 25 should be adjusted so that none of the resistance 24 is in circuit.

It will thus be seen that a simple welding controller has been provided which will automatically regulate the welding current and protect the circuit under all conditions. The current is limited at starting to a safe value and after the arc has been established and its resistance sufficiently increased, the limiting means is removed so that a heavy welding current may flow. At the same time a limiting means is provided which will prevent an undue rush of current if the resistance of the arc should suddenly be decreased. The controller automatically reinserts the limiting resistance when the welding circuit is broken so that the apparatus is always in condition for safe operation. The controller comprises a minimum number of parts and is devoid of complicated connections and intricate devices.

It should be understood that the embodiment shown is for purposes of illustration only and that other structures may be devised which will embody the invention and which are included within the spirit and scope of the appended claims.

Having thus described our invention, what we claim as new and desire to secure by Letters Patent of the United States is:

1. A welding controller comprising a current limiting resistance, and a switch therefor having a pair of windings subjected to the same electrical conditions to include said resistance when the welding current tends to rise above a certain value and to exclude said resistance when the welding current is below a certain value.

2. A welding controller comprising a welding circuit, a switch having a pair of windings subjected to the same electrical conditions and having different pull characteristics, and a resistance controlled by said switch to be included in the circuit when the welding current tends to rise above a certain value and to be excluded from the circuit when the welding current falls below a certain value.

3. A welding controller having a switch with two windings in series with the welding current, one winding to close the switch and the other to open the switch, and current limiting means controlled by said switch.

4. A welding controller having a switch with two windings under the influence of the welding current, one winding tending to close the switch and the other tending to open the switch, and current limiting means controlled by said switch.

5. A welding controller having a current limiting resistance for the welding current; and a switch for controlling the resistance, said switch having a pair of windings under the influence of the welding current, and a circuit closing member common to both said windings influenced by one of said windings to open the switch and by the other of said windings to close the switch.

6. A welding controller provided with a resistance to limit the welding current and an electromagnetic switch having a closing winding and a holding winding whereby the switch is held in one position under certain electrical conditions and moved to another position under other electrical conditions to automatically control the resistance.

7. A welding controller provided with a resistance for limiting the welding current, an electromagnetic switch having a closing winding and a holding winding responsive directly to the welding current whereby the switch is held open when current in the welding circuit is high and is closed to exclude said resistance when the current decreases to a predetermined value, said switch being normally biased to open position whereby the resistance is automatically reinserted when the welding circuit is broken.

8. A welding controller having a switch, a current limiting resistance controlled by said switch for controlling the welding current, and a pair of windings common to said switch and in series with the welding current, one of said windings preventing closure of said switch upon an abnormal flow of welding current and the other of said windings effecting the closing of said switch upon the flow of normal welding currents.

9. A welding controller having a current limiting resistance for the welding current, a switch adapted to include and exclude said resistance, and a pair of windings in series with the welding current and both acting upon said switch, one to close the switch to exclude said resistance upon the flow of normal welding currents and the other to hold the switch open or to open the switch to include said resistance upon the flow of abnormal welding currents.

10. A welding controller having a pair of electrodes between which an arc may be drawn for the welding operation, a resistance for controlling the welding current, a switch for including and excluding said resistance, and a pair of windings common to said switch and both in series with one of said electrodes at starting to close said switch after but not before the arc is drawn.

In witness whereof, we have hereunto subscribed our names in the presence of two witnesses.

EDWIN B. H. TOWER, Jr.
RAYMOND H. VAN NEST.

Witnesses:
LAURA E. SMITH,
T. D. MONTGOMERY.